United States Patent
Hood

(10) Patent No.: US 9,806,361 B2
(45) Date of Patent: Oct. 31, 2017

(54) FUEL CELL PLATE ASSEMBLIES

(71) Applicant: Intelligent Energy Limited, Loughborough (GB)

(72) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 6 days.

(21) Appl. No.: 14/401,781

(22) PCT Filed: May 20, 2013

(86) PCT No.: PCT/GB2013/051312
§ 371 (c)(1),
(2) Date: Nov. 17, 2014

(87) PCT Pub. No.: WO2013/178988
PCT Pub. Date: Dec. 5, 2013

(65) Prior Publication Data
US 2015/0125782 A1    May 7, 2015

(30) Foreign Application Priority Data

May 28, 2012 (GB) .................................. 1209402.5

(51) Int. Cl.
*H01M 8/0247* (2016.01)
*H01M 8/04082* (2016.01)
*H01M 8/0271* (2016.01)
*H01M 8/0258* (2016.01)
*H01M 8/0276* (2016.01)
(Continued)

(52) U.S. Cl.
CPC ..... *H01M 8/04201* (2013.01); *H01M 8/0247* (2013.01); *H01M 8/0258* (2013.01); *H01M 8/0271* (2013.01); *H01M 8/0278* (2013.01); *H01M 8/1007* (2016.02); *H01M 2004/8694* (2013.01); *H01M 2008/1095* (2013.01)

(58) Field of Classification Search
None
See application file for complete search history.

(56) References Cited

U.S. PATENT DOCUMENTS 4,728,585 A * 3/1988 Briggs ................ H01M 8/2465
204/270
2004/0038103 A1 2/2004 Wariishi et al.
(Continued)

FOREIGN PATENT DOCUMENTS

CN      101330151 A      12/2008
CN      101816089 A       8/2010
(Continued)

OTHER PUBLICATIONS

International Search Report dated Sep. 13, 2013, issued in International Patent Application PCT/GB2013/051312.
(Continued)

*Primary Examiner* — Yoshitoshi Takeuchi
(74) *Attorney, Agent, or Firm* — Baker & Hostetler LLP

(57) ABSTRACT

A fuel cell plate assembly (400) comprising: a bipolar plate (102) having a port (104) for receiving a fluid; a fluid diffusion layer (210); and an electrode defining an active area (105). The fluid diffusion layer is configured to communicate a fluid received at the port (104) to the active area (105).

10 Claims, 8 Drawing Sheets

(51) Int. Cl.
*H01M 8/1007* (2016.01)
*H01M 4/86* (2006.01)
*H01M 8/1018* (2016.01)

(56) References Cited

U.S. PATENT DOCUMENTS

| | | | |
|---|---|---|---|
| 2004/0076869 A1 | 4/2004 | Zhang et al. | |
| 2004/0131916 A1* | 7/2004 | Hodge | H01M 8/023 |
| | | | 429/434 |
| 2004/0151969 A1 | 8/2004 | Ian et al. | |
| 2004/0197630 A1 | 10/2004 | Wilson et al. | |
| 2004/0258977 A1* | 12/2004 | Frank | H01M 8/008 |
| | | | 429/469 |
| 2007/0042261 A1* | 2/2007 | Kohyama | H01M 8/0247 |
| | | | 429/480 |
| 2008/0076005 A1 | 3/2008 | Levesque et al. | |
| 2008/0305384 A1 | 12/2008 | Kawashima et al. | |
| 2012/0107712 A1 | 5/2012 | Schmidt et al. | |
| 2012/0189922 A1 | 7/2012 | Schmidt et al. | |

FOREIGN PATENT DOCUMENTS

| | | |
|---|---|---|
| JP | 2003-197217 A | 7/2003 |
| JP | 2003-272666 A | 9/2003 |
| JP | 2004-119083 A | 4/2004 |
| JP | 2004-119084 A | 4/2004 |
| JP | 2004-192995 A | 7/2004 |
| JP | 2004-192996 A | 7/2004 |
| JP | 2004-241141 A | 8/2004 |
| JP | 2005-158325 A | 6/2005 |
| JP | 2008-004494 A | 1/2008 |
| JP | 2010-073565 A | 4/2010 |
| JP | 2010-135156 A | 6/2010 |
| JP | 2010123350 | 6/2010 |
| JP | 2010-272350 | 12/2010 |
| JP | 2012-043556 A | 3/2012 |
| JP | 2012-099382 A | 5/2012 |
| WO | WO 2004/088779 A1 | 10/2004 |
| WO | WO 2009/028331 A1 | 3/2009 |

OTHER PUBLICATIONS

International Preliminary Report on Patentability dated Dec. 11, 2014, issued in International Patent Application PCT/GB2013/051312.

GB Search Report dated Sep. 14, 2012, issued in GB Patent Application GB1209402.5.

* cited by examiner

FUEL CELL PLATE ASSEMBLIES

This patent application claims priority to International Patent Application PCT/GB2013/051312 filed on May 20, 2013, which claims priority to United Kingdom Patent Application 1209402.5 filed on May 28, 2012, the contents of which are incorporated here in their entirety.

The present disclosure relates to the field of fuel cell plate assemblies, and in particular, although not exclusively, to fuel cell plate assemblies that can be put together to form a fuel cell stack.

Conventional electrochemical fuel cells convert fuel and oxidant, generally both in the form of gaseous streams, into electrical energy and a reaction product. A common type of electrochemical fuel cell for reacting hydrogen and oxygen comprises a polymeric ion (proton) transfer membrane, with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack may be formed comprising a number of such membranes arranged with separate anode and cathode fluid flow paths. Such a stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached. Cooling may be achieved by forcing air through the cathode fluid flow paths. In an open cathode stack, the oxidant flow path and the coolant path are the same, i.e. forcing air through the stack both supplies oxidant to the cathodes and cools the stack.

According to a first aspect of the invention, there is provided a fuel cell plate assembly comprising:
- a bipolar plate comprising a port for receiving a fluid;
- a fluid diffusion layer; and
- an electrode defining an active area;
- wherein the fluid diffusion layer is configured to communicate a fluid received at the port to the active area.

Using the fluid diffusion layer to communicate the fluid can avoid the need for using any grooves in the bipolar plate to provide the communication path for the fluid. Such grooves can be disadvantageous, especially when a sub-gasket of an electrode assembly is located on top of the grooves, as the layer of material that is over the grooves can sag into the grooves and hinder the transport of the fluid.

The fluid diffusion layer may extend between the port and the active area. The fluid diffusion layer may comprise an extending region, or tab, that is located outside of the footprint of the active area. Using such a tab provides a convenient means for communicating the fluid, and also can make an efficient use of fluid diffusion layer material.

The extending region of the fluid diffusion layer may be in contact with the bipolar plate between the port and the active area. In this way, no additional gasket or sub-gasket is required between the fluid diffusion layer and the bipolar plate.

The port may also be configured to convey the fluid to or from an adjacent fuel cell plate assembly through the thickness of the fuel cell plate assembly. In this way, the ports of multiple fuel cell plate assemblies can transport the fluid along the stack for each of the individual fuel cell plate assemblies.

The fluid diffusion layer may be configured to communicate a fluid received at the port to the active area along the plane of the fuel cell plate assembly. In this way, the flow of fluid can be redirected from a first direction in which it is received at the port through the thickness of the assembly to a second direction in the plane of the assembly. The first and second directions may be generally transverse or orthogonal to each other.

The fuel cell plate assembly may further comprise a first track of adhesive (or sealant) around the port. The first track of adhesive may be configured to provide a seal between the bipolar plate and a second bipolar plate of an adjacent fuel cell plate assembly in a stack. This seal enables the fluid to pass between successive fuel cell plate assemblies without significant leakage.

The first track of adhesive may extend over the extending region of the fluid diffusion layer. In this way, a portion of the extending region is exposed to fluid in the port such that it can communicate the fluid to the active area.

The bipolar plate may comprise one or more fluid flow channels. The fluid diffusion layer may be configured to communicate the fluid received at the port to the one or more fluid flow channels. The fluid flow channels can be configured to disperse the fluid laterally across the width of the fuel cell plate assembly externally to the fluid diffusion layer.

The bipolar plate may comprise one or more port channels configured to communicate the fluid received at the port to the one or more fluid flow channels or the footprint of the active area. The port channels may be grooves or indentations in the bipolar plate. The port channels may be used to supplement the transport of fluid from the port to the active area through the fluid diffusion layer. The fluid diffusion layer may be sufficiently rigid such that it does not sag into the port channels, and may not require a gasket or sub-gasket to increase the rigidity of the fluid diffusion layer.

The fluid diffusion layer may be configured to communicate fluid between a plurality of fluid flow channels in the bipolar plate. Alternatively, or additionally, the bipolar plate may comprise one or more connecting channels configured to communicate fluid between the fluid flow channels. The connecting channels may be grooves or indentations in the bipolar plate. In this way, the fluid can be dispersed across the active area of the electrode.

The bipolar plate may further comprise a second port at an opposing end of the bipolar plate to the port. The fluid diffusion layer may be configured to communicate a fluid between the active area and the second port. The second port may be an inlet for providing fluid to the active area, or may be an outlet for receiving fluid from the active area.

The fluid diffusion layer may be an anode fluid diffusion layer. The fuel cell plate assembly may further comprise a laminate layer comprising a cathode fluid diffusion layer and a membrane electrode assembly comprising the electrode.

There may be provided a fuel cell stack comprising a plurality of fuel cell plate assemblies as described herein.

A description is now given, by way of example only, with reference to the accompanying drawings, in which.

One or more embodiments disclosed herein relate to a fuel cell plate assembly that can be placed next to other fuel cell plate assemblies to form a fuel cell stack. The fuel cell plate assembly comprises a bipolar plate, a fluid diffusion layer and an electrode that defines an active area. The bipolar plate has a port for receiving a fluid such as hydrogen. The fluid diffusion layer is configured to communicate a fluid received at the port to the active area. In some embodiments, the fluid diffusion layer may have a tab that extends between the port and the fluid flow channels.

Using the fluid diffusion layer to communicate the fluid to the active area can avoid the need for using any grooves in the bipolar plate to provide the communication path for the fluid. Such grooves can be disadvantageous as a sub-gasket of an electrode assembly that may otherwise be located above the grooves can sag into the grooves and hinder the transport of the fluid. In addition, the sub-gasket can be relatively expensive component, and therefore avoiding the need for the sub-gasket can reduce the overall cost and component count of the fuel cell plate assembly.

In addition, such a fuel cell plate assembly can enable an electrode material to be used without a bonded sub gasket. Such a bonded gasket would otherwise be required to provide support for the electrode, which can be extremely vulnerable to varying mechanical forces and direct exposure to fuel and oxidant gases. The tab in the GDL can allow gas communication to the electrode without generating mechanical stress that would otherwise exist in the presence of a gap between a separate gasket and the GDL. Further still, due to the avoidance of the gap between the GDL and the separate gasket, any issues of gas skipping (when the anode gas skips around the GDL from inlet end to exhaust end rather than through it) can be reduced or eliminated. The tab can also allow the relatively crude process of gluing the entire stack assembly together and provide good uniformity (cell to cell) in gas distribution to the anodes.

Figure 1:
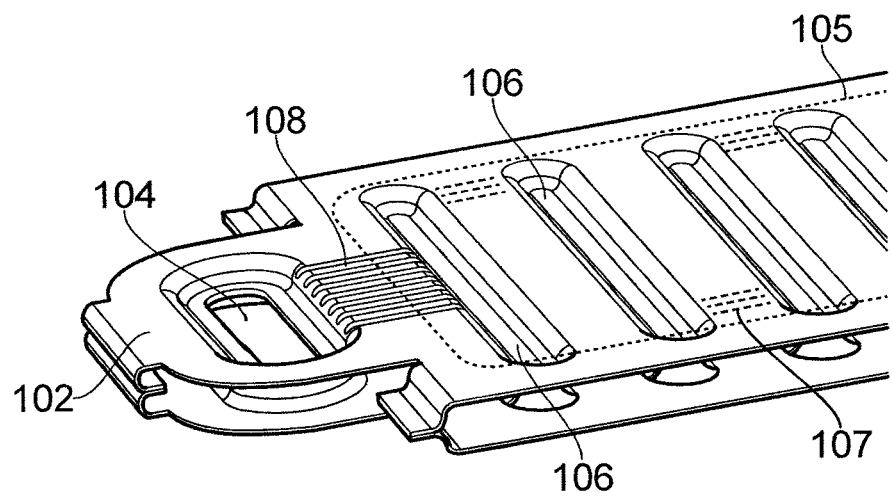
FIGS. 1 to 4 show schematically how a fuel cell plate assembly according to an embodiment of the invention can be built up.
Figure 2:
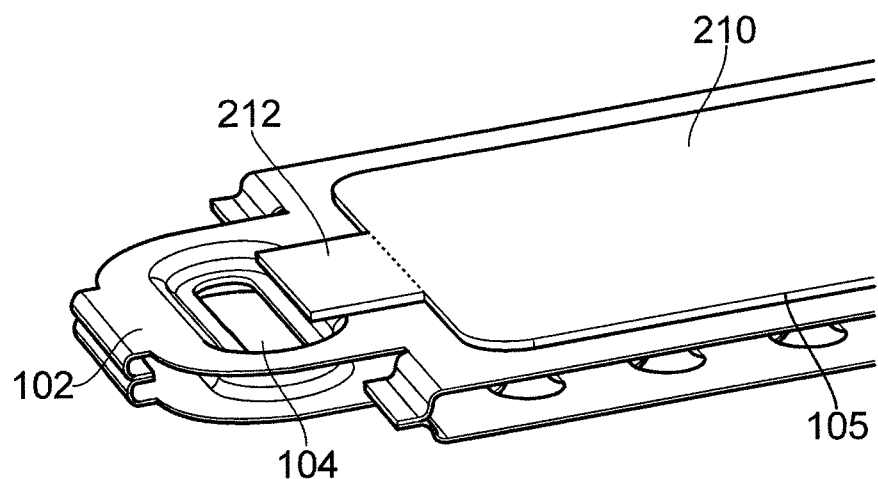
Figure 3:
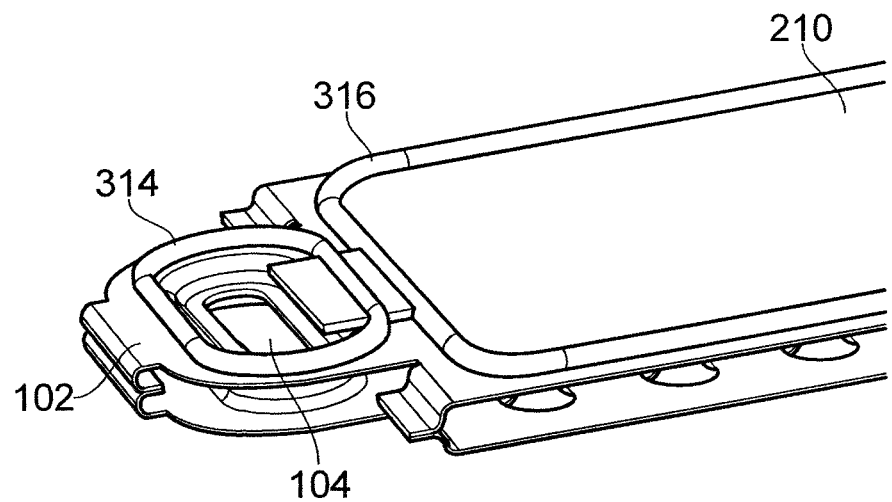
Figure 4:
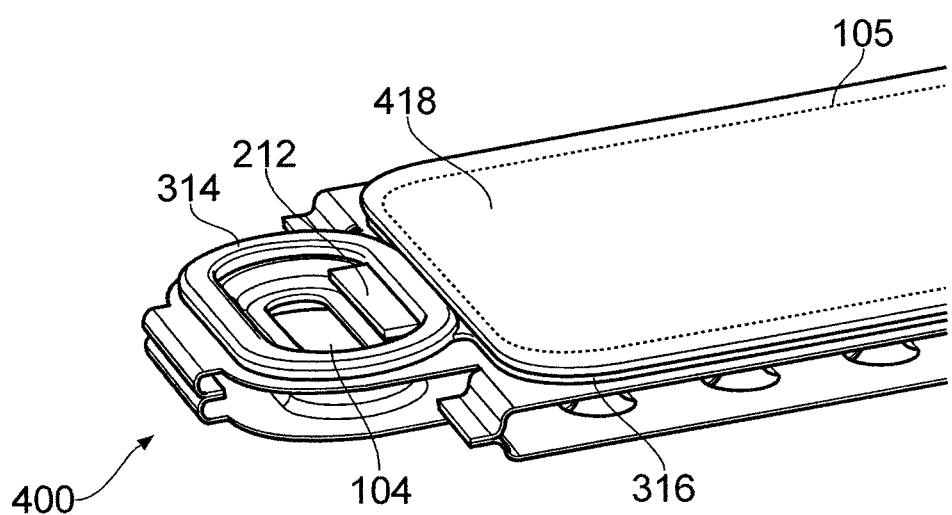

FIGS. 1 to 4 show how a fuel cell plate assembly according to an embodiment of the invention can be built up. FIG. 1 shows a bipolar plate 102. FIG. 2 shows a first fluid diffusion layer 210 placed over the bipolar plate. FIG. 3 shows adhesive 314, 316 dispensed over the bipolar plate 102 and first fluid diffusion layer 210. FIG. 4 shows a laminate layer 418, which includes a membrane electrode assembly and a second fluid diffusion layer, placed over the first fluid diffusion layer and adhesive 316. Further details are provided below.

Figure 6:
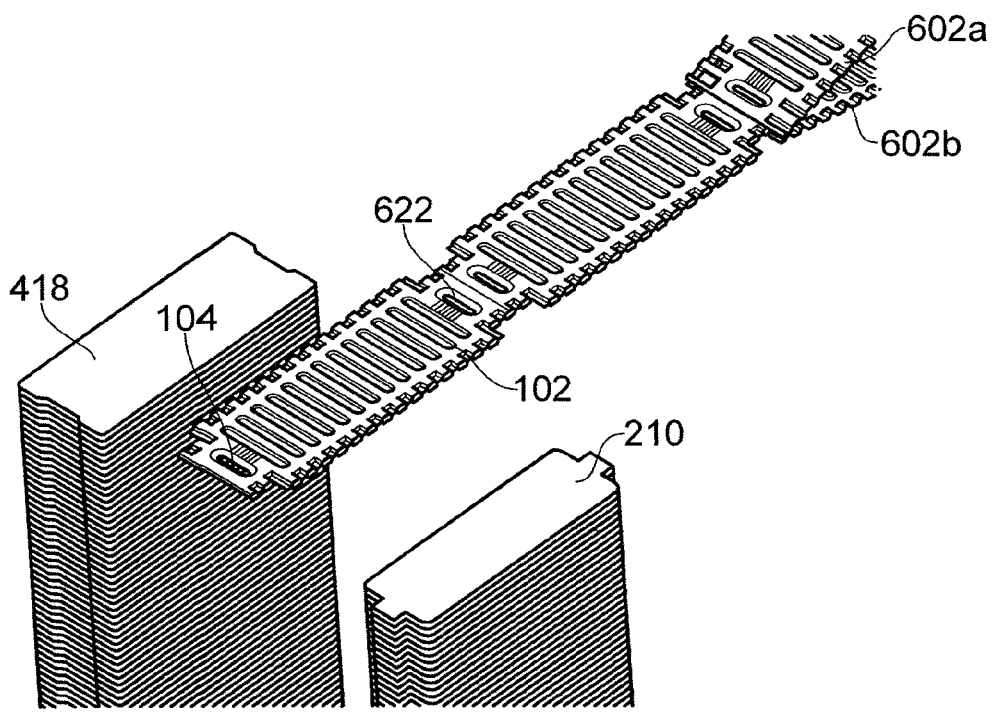
FIGS. 6 to 12 illustrate schematically how a fuel cell plate assembly can be constructed according to an embodiment of the invention.

FIG. 1 shows one end of a bipolar plate 102 that can provide part of a fuel cell plate assembly according to an embodiment of the invention. The end of the bipolar plate 102 that is shown in FIG. 1 has a port 104. It will be appreciated that the other end of the bipolar plate 102 can also have a port, as shown in FIG. 6. The port 104 is for receiving a fluid, such as hydrogen, that is to be provided to an active area of an electrode. The footprint of the active area of an electrode is shown with reference 105 in FIG. 1, even though the electrode itself is not shown. The electrode is described in more detail below with reference to FIG. 4.

The active area 105 can be considered as the footprint/area of the gas diffusion layers (GDLs) that are in contact with the electrode surfaces such that the electrodes are provided with the necessary reactant gasses to promote proton exchange through the membrane.

The port 104 receives the fluid in a direction that is through the thickness of the bipolar plate 102. In addition to providing the fluid to the electrode, the port 104 also passes the fluid to an adjacent fuel cell assembly in a fuel cell stack as the ports of the bipolar plates are aligned when the stack is constructed.

In this example, the bipolar plate 102 has a plurality of fluid flow channels 106, which are discontinuous and extend across a lateral width of the bipolar plate 102. In this way, the fluid can be laterally dispersed across the width of the active area 105 when the fluid enters the fluid flow channels 106.

As will be discussed in more detail below, the fluid passes along the longitudinal length of the bipolar plate 102 through a gas diffusion layer. However, one or more optional port channels 108 can provide a fluid connection between the port 104 and the active area 105. The port channels 108 can be provided as grooves in the bipolar plate 102. The relationship between the port channels 108 and the fluid diffusion layer will be described in more detail below with reference to FIG. 2.

In addition, one or more optional connecting channels 107 can also transport the fluid between successive fluid flow channels 106 along the length of the bipolar plate 102. Such connecting channels 107 can also be provided as grooves in the bipolar plate 102. The connecting channels 107 may alternate between connecting different ends of the fluid flow channels 106 so as to provide a winding or inter-digitized path along the longitudinal length of the bipolar plate 102. This can encourage the fluid to penetrate a large proportion of the fluid diffusion layer so that it is presented evenly to the electrode.

FIG. 2 shows a fluid diffusion layer 210 located on the bipolar plate 102 of FIG. 1. The fluid diffusion layer is typically known as a gas diffusion layer (GDL), and in this example will be referred to as an anode GDL 210 as it provides gas to the active area of the anode side of the electrode.

The anode GDL 210 has an extending region 212 that extends between the port 104 of the bipolar plate 102 and the active area 105. The tab 212 is outside the footprint of the active area 105. The extending region will be referred to as a tab 212. The tab 212 extends from the main body of the anode GDL 210, which in this example is generally co-located with the active area 105. The tab 212 of the anode GDL can communicate the hydrogen received at the port 104 to the active area 105. As identified above, the port channels 108 shown in FIG. 1 can also communicate the hydrogen from the port 104 to the active area 105. However, it will be appreciated that these port channels 108 are optional as the transport of hydrogen can take place solely through the anode GDL 210. Similarly, the connecting channels 107 of FIG. 1 are also optional as the anode GDL 210 can be the sole means for communicating the hydrogen between the fluid flow channels 106.

FIG. 3 shows two tracks of adhesive 314, 316 deposited on the bipolar plate 102 and anode GDL 210 of FIG. 2. A first track of adhesive 314 provides a continuous loop around the port 104 and passes over the tab 212 of the anode GDL 210. A second track of adhesive 316 is deposited on the bipolar plate 102 around the outside of the anode GDL 210, which also passes over the tab 212 of the anode GDL 210. In this way, the second track of adhesive 316 is positioned so that it provides a seal around the anode GDL 210 when the membrane electrode assembly is located on the partial fuel cell plate assembly.

The adhesive is selected such that penetration of the adhesive into the tab 212 of the anode GDL 210 is minimal, thereby not significantly impeding fluid transport through the anode GDL 210.

FIG. 4 shows a fuel cell plate assembly 400 in which a laminate layer 418 has been added to the partial fuel cell plate assembly of FIG. 3. The laminate layer is a 4-layer membrane electrode assembly (MEA) and comprises a cathode fluid diffusion layer, a first layer of catalyst, an electrode membrane and a second layer of catalyst. The two catalyst layers and the electrode membrane can be referred to together as a membrane electrode assembly comprising the electrode.

The 4-layer MEA 418 is positioned over the second track of adhesive 316. It can be seen from FIG. 4 that the second track of adhesive 316 has been displaced and spread out such that it abuts the first track of adhesive 314 thereby providing a seal around the tab 212 of the anode GDL 210 that is outside the port 104. Also, the two displaced adhesive tracks 314, 316 meet over the surface of the tab 212 thereby completing the anode enclosure and providing a global anode seal for the cell.

The active area is defined within the periphery of the 4-layer MEA 418 as an outer band of the 4-layer MEA 418 is positioned over the adhesive 316, which prevents the transport of the anode gas (hydrogen) to the electrode. It will be appreciated that the placement of the adhesive can be controlled so as to minimise the displacement of the adhesive into the intended active area 105.

Figure 5:
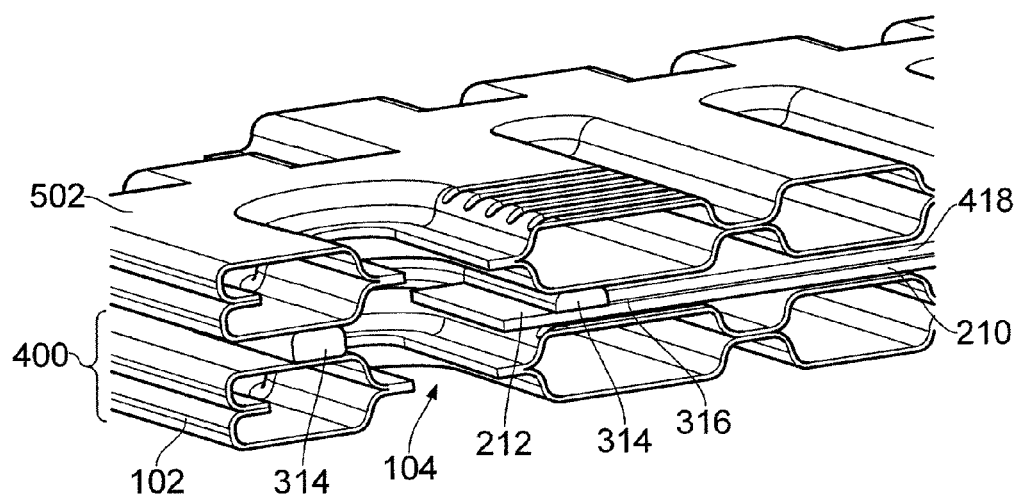
FIG. 5 shows a section view of a second bipolar plate positioned on top of the fuel cell plate assembly of FIG. 4.

FIG. 5 shows a section view of a second bipolar plate 502 positioned on top of the fuel cell plate assembly 400 of FIG. 4. As is known in the art, a plurality of fuel cell plate assemblies 400 can be built up to form a fuel cell stack.

As shown in FIG. 5, when the second bipolar plate 502 is positioned on top of the fuel cell assembly 400 it contacts the first track of adhesive 314 around the port 104 of the first bipolar plate 102. This first track of adhesive 314 therefore creates a seal around the ports of the two bipolar plates, underneath which the tab 212 of the anode GDL 210 passes. If the bipolar plate 102 includes port channels (as shown in FIG. 1 with reference 108), then the tab 212 of the anode GDL 210 can be rigid enough to prevent slumping into the grooves of the port channels. This can be in contrast to prior art fuel cells, whereby a sub-gasket associated with the electrode is located above the grooves, and can sag into the grooves.

FIGS. 6 to 12 illustrate schematically how a fuel cell plate assembly can be constructed according to an embodiment of the invention.

FIG. 6 illustrates a strip of bipolar plates 102 that are provided to a build point. It can be seen that the bipolar plates 102 in this example have two ports 104, 622. The first port 104 is an inlet as discussed in detail above. The second port 622 can be an outlet or an inlet. In some embodiments, the stoichiometric efficiency of the reaction with the hydrogen in the fuel cell is greater than one, and therefore the second port 622 should be used as an outlet in order to provide a through flow for product water management. In other embodiments, the second port 622 can also be an inlet if the stoichiometric efficiency and/or water management techniques permit.

The bipolar plates may comprise a separate anode sheet 602a and a cathode sheet 602b that are only joined together, for example resistance, laser or adhesive bonded together shortly before the bipolar plate 102 enters the build point. This is shown in FIG. 6 as the anode sheets 602a and cathode sheets 602b are initially supplied separately.

Located on either side of the build point are a stack of anode GDLs 210 and a stack of 4-layer MEAs 418.

Figure 7:
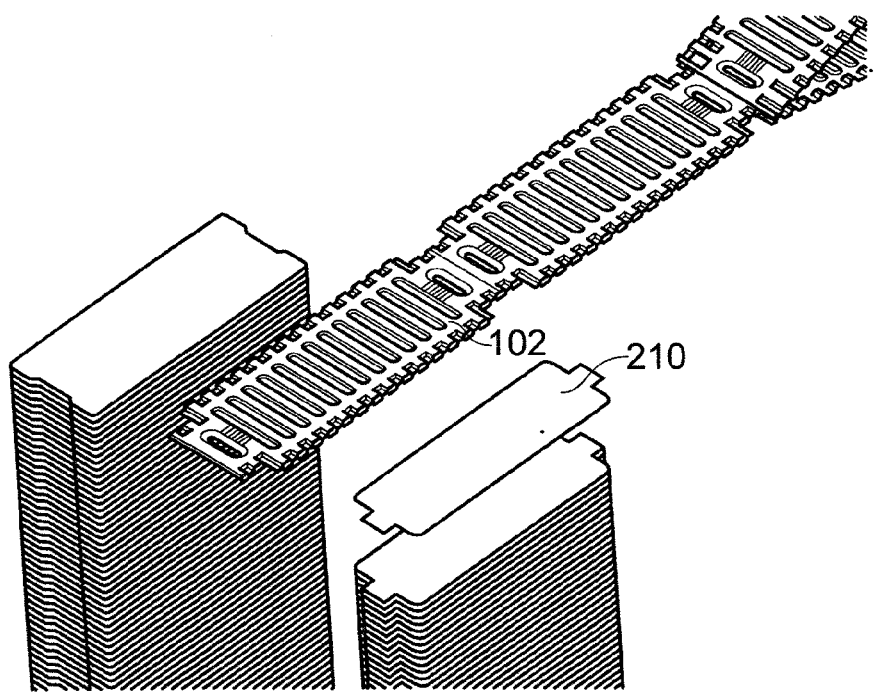
Figure 8:
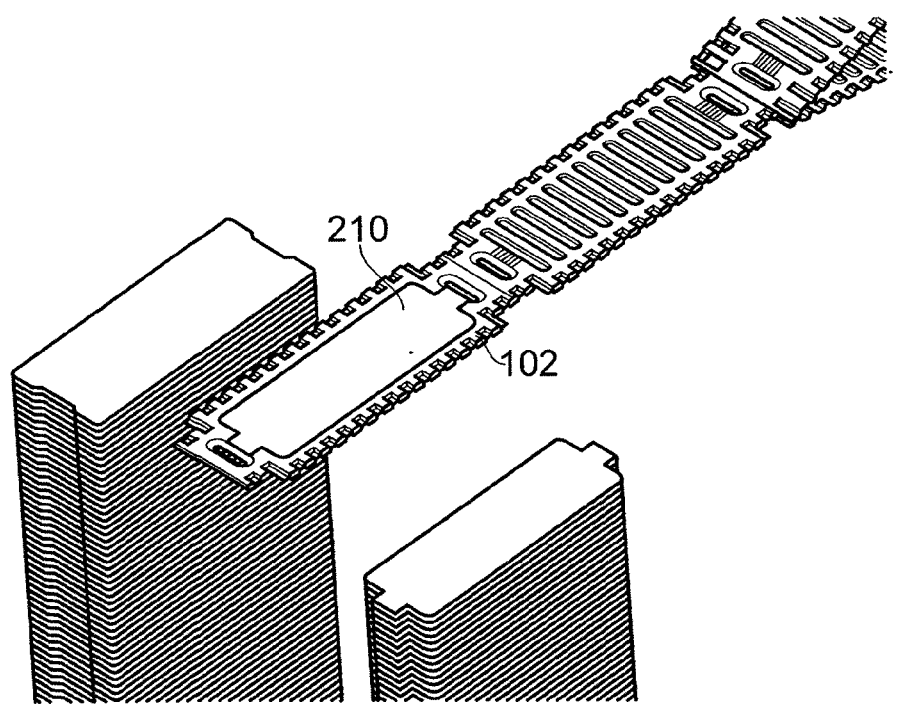

FIG. 7 shows that a first anode GDL 210 has been taken from the stack ready for positioning on the bipolar plate in the same way as shown in FIG. 2. It will be appreciated that this operation, and the operations that follow, can be automated. FIG. 8 shows the anode GDL 210 located in position on the bipolar plate 102.

Figure 9:
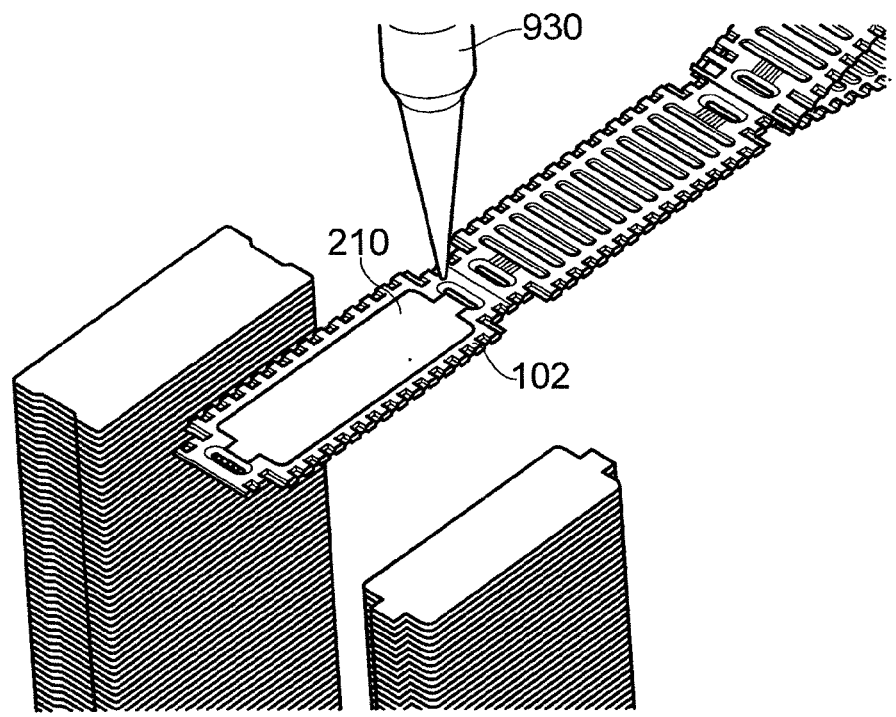

FIG. 9 shows an adhesive dispenser 930 in position above the anode GDL 210 and bipolar plate 102.

Figure 10:
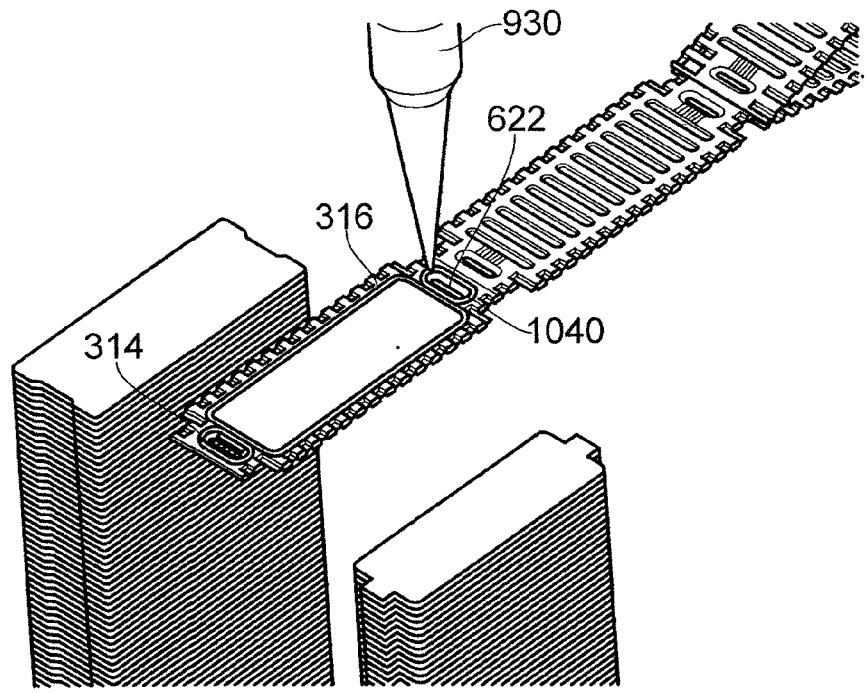

FIG. 10 shows three tracks of adhesive 314, 316, 1040 that have been dispensed by the adhesive dispenser 930. The first track 314 and second track 316 are the same as those described with reference to FIG. 3. Also shown in FIG. 10 is a third track of adhesive 1040 that provides a continuous loop around the second port 622. This is in the same way that the first track of adhesive 314 provides a continuous loop around the first port 104.

Figure 11:
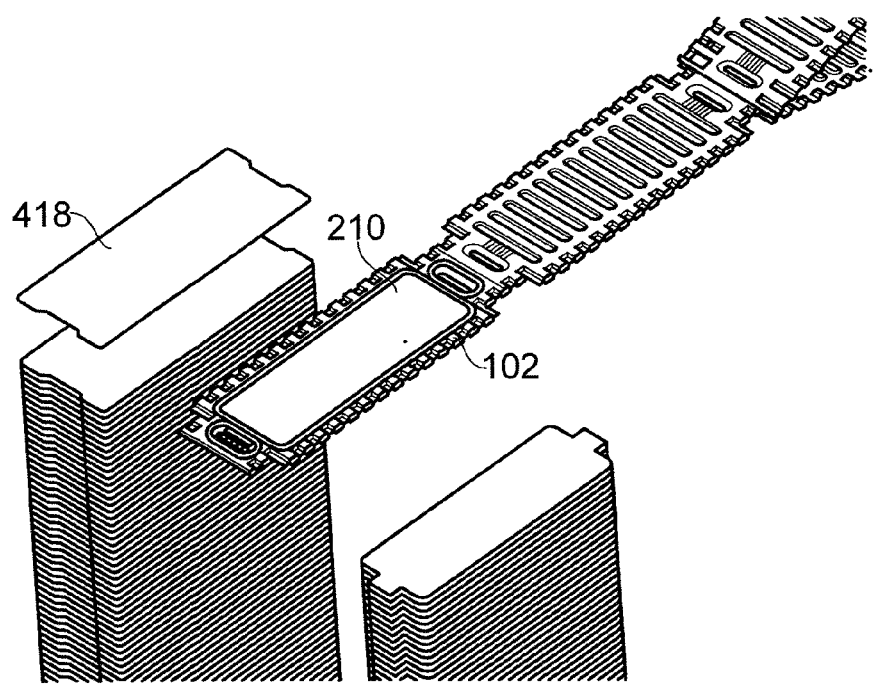
Figure 12:
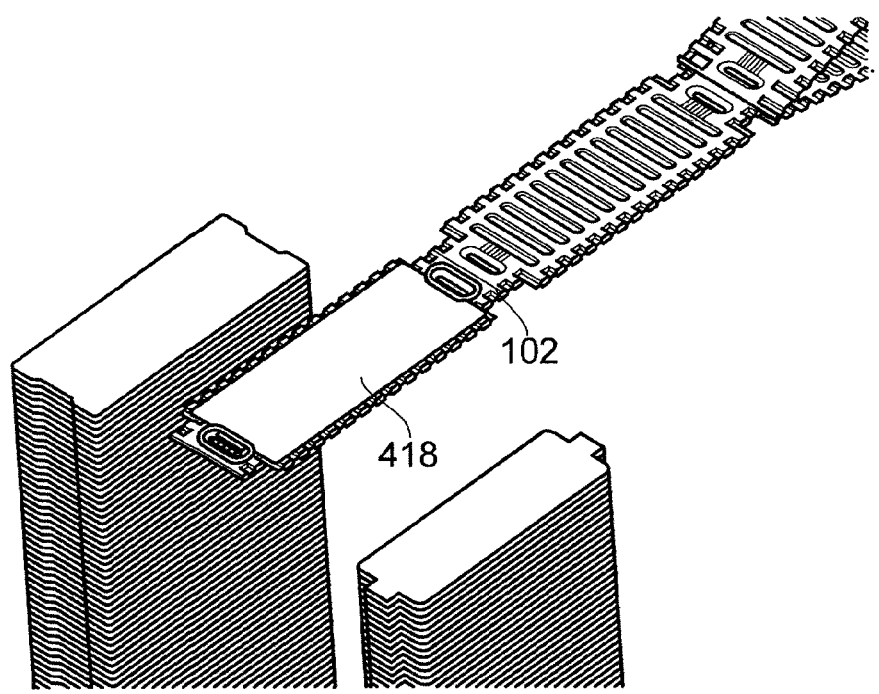

FIG. 11 shows that a 4-layer MEA has been taken from the stack ready for positioning on the bipolar plate 102 and anode GDL 210 in the same way as shown in FIG. 4. FIG. 12 shows the 4-layer MEA 418 located in position on the bipolar plate 102 and anode GDL 210.

It will be appreciated that each of the construction steps illustrated by FIGS. 6 to 12 can be performed at the same build point.

Figure 13:
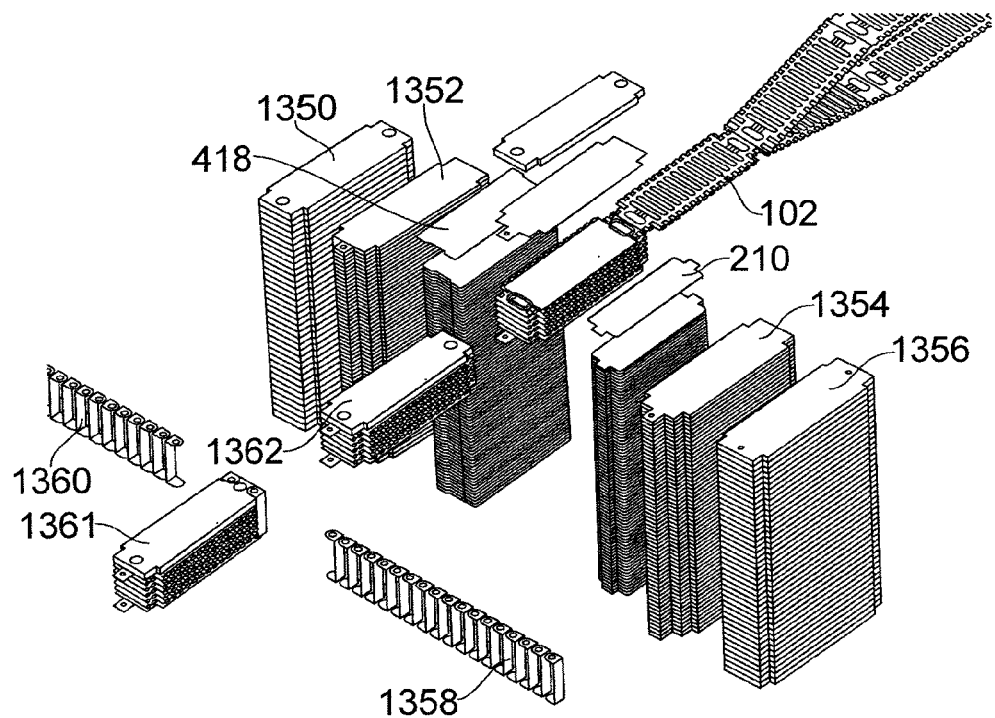
FIG. 13 illustrates schematically how a fuel cell stack can be put together according to an embodiment of the invention.

FIG. 13 develops the method of construction illustrated by FIGS. 6 to 12 such that a fuel cell stack can be put together. FIG. 13 illustrates a strip of bipolar plates 102, a stack of anode GDLs 210 and a stack of 4-layer MEAs 418 that are the same as those illustrated in FIGS. 6 to 12. In addition, FIG. 13 shows two stacks of components 1350, 1352 for a top end plate of the fuel cell stack and two stacks of components 1354, 1356 for a bottom end plate of the fuel cell stack. Plates from the stacks 1354, 1356 for the bottom end plate are located at the build point before the construction of the fuel cell plate assemblies is begun, and plates from the stacks 1350, 1352 for the top end plate are located on top of the fuel cell assemblies at the build point when the fuel cell stack has been built to the desired size. The fuel cell stack can then be moved from the build point, as shown with reference 1362 in FIG. 13.

Finally, clips 1358, 1360 can be attached to each side of the fuel cell stack 1362 to keep the fuel cell plate assemblies together at the intended working dimension in order to provide a completed fuel cell stack 1361.

Figure 14:
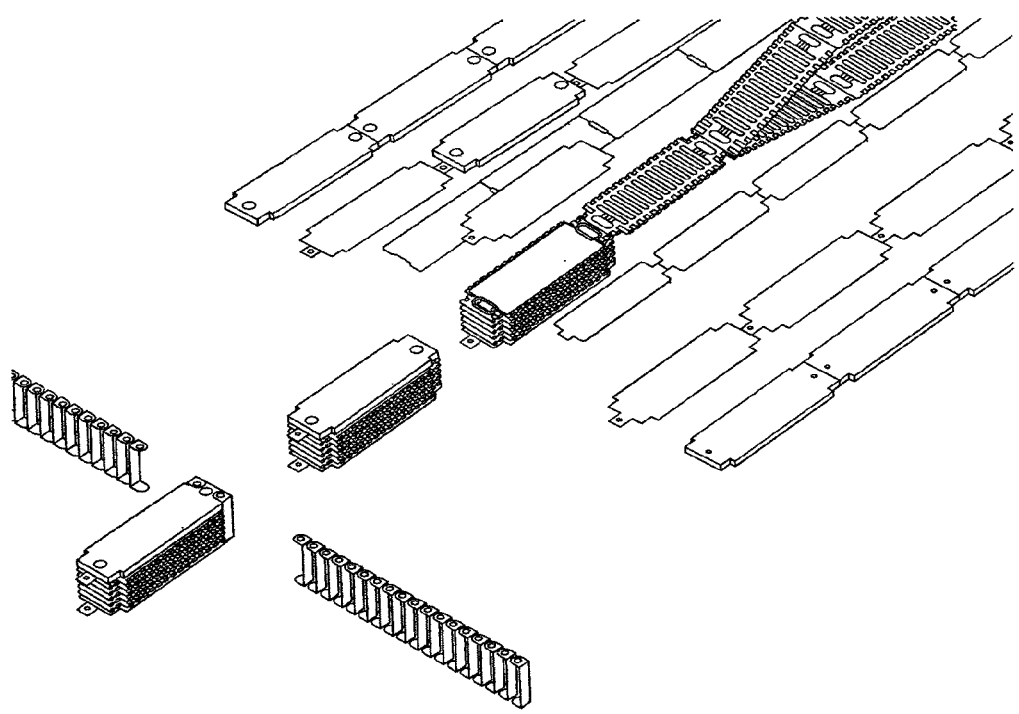
FIG. 14 illustrates schematically how a fuel cell stack can be put together according to an alternative embodiment of the invention.

FIG. 14 illustrates an alternative method for constructing a fuel cell stack according to an embodiment of the invention. In this example, the anode GDL, 4-layer MEAs and components for the end plates are strip supplied and segmented just before a pick and place process.

Figure 15:
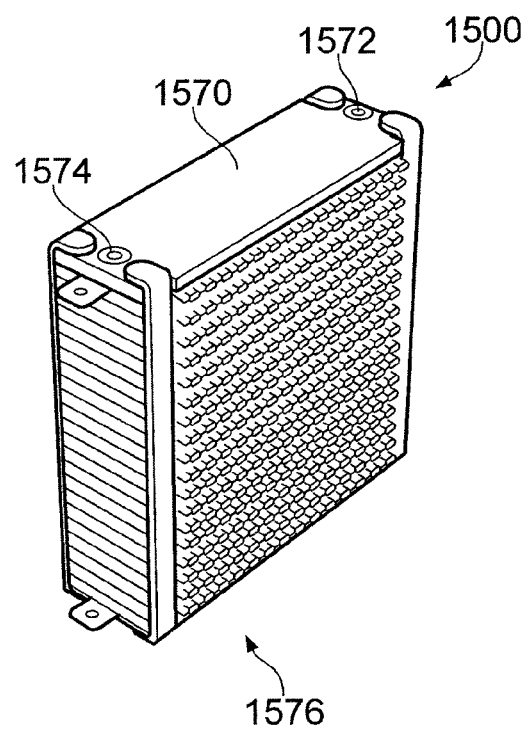
FIG. 15 illustrates a fuel cell stack according to an embodiment of the invention.

FIG. 15 illustrates a fuel cell stack 1500 according to an embodiment of the invention. The top end plate 1570 of the fuel cell stack includes two apertures 1572, 1574 that are respectively in fluid connection with the ports (not shown in FIG. 15) at each end of the fuel cell plate assemblies. It will be appreciated that similar apertures may be provided in the bottom end plate 1576 if required.

The invention claimed is:

1. A fuel cell plate assembly comprising:
   a bipolar plate comprising a port for receiving a fluid;
   a fluid diffusion layer;
   an electrode defining an active area;
   wherein the fluid diffusion layer comprises an extending region that is located outside of the footprint of the active area and extends between the port and the active area in order to communicate the fluid received at the port to the active area, the fuel cell plate assembly further comprising a first track of adhesive around the port, the first track of adhesive configured to provide a seal on the fuel cell plate assembly, wherein the first track of adhesive extends over the extending region of the fluid diffusion layer; and, wherein the bipolar plate comprises one or more fluid flow channels, and the fluid diffusion layer is configured to communicate the fluid received at the port to the one or more fluid flow channels.

2. The fuel cell plate assembly of claim 1, wherein the fluid diffusion layer extends from the port to the active area.

3. The fuel cell plate assembly of claim 2, wherein the fluid diffusion layer comprises an extending region that is located outside of the footprint of the active area.

4. The fuel cell plate assembly of claim 2, wherein the extending region of the fluid diffusion layer is in contact with the bipolar plate between the port and the active area.

5. The fuel cell plate assembly of claim 1, wherein the port is also configured to convey the fluid to or from an adjacent fuel cell plate assembly through the thickness of the fuel cell plate assembly.

6. The fuel cell plate assembly of claim 1, wherein the fluid diffusion layer is configured to communicate a fluid received at the port to the active area along the plane of the fuel cell plate assembly.

7. The fuel cell plate assembly of claim 1, wherein the bipolar plate comprises one or more port channels configured to communicate the fluid received at the port to the one or more fluid flow channels.

8. The fuel cell plate assembly of claim 1, wherein the bipolar plate comprises one or more connecting channels configured to communicate fluid between the fluid flow channels.

9. The fuel cell plate assembly of claim 1, wherein the bipolar plate further comprises a second port at an opposing end of the bipolar plate to the port, and wherein the fluid diffusion layer is configured to communicate a fluid between the active area and the second port.

10. The fuel cell plate assembly of claim 1, wherein the fluid diffusion layer is an anode fluid diffusion layer, and the fuel cell plate assembly further comprises a laminate layer comprising a cathode fluid diffusion layer and a membrane electrode assembly comprising the electrode.

* * * * *